United States Patent [19]

Berkovitz

[11] 4,030,569

[45] June 21, 1977

[54] TRACTION ELEVATOR SYSTEM HAVING CABLE GROOVE IN DRIVE SHEAVE FORMED BY SPACED, ELASTICALLY DEFLECTABLE METALLIC RING MEMBERS

[75] Inventor: Harry Berkovitz, Glen Rock, N.J.

[73] Assignee: Westinghouse Electric Corporation, Pittsburgh, Pa.

[22] Filed: Oct. 7, 1975

[21] Appl. No.: 620,441

[52] U.S. Cl. .............................. 187/20; 74/230.3; 74/230.5; 74/230.24; 242/155 BW; 254/190 R; 254/191
[51] Int. Cl.² .................................... B66B 11/08
[58] Field of Search ........................... 187/20–23, 187/1 A; 254/190 R, 191, 192; 74/230.3, 230.5, 230.7, 230.24; 242/155 BW

[56] References Cited

UNITED STATES PATENTS

| 1,802,759 | 4/1931 | Dunlop | 187/1 A |
| 3,838,752 | 10/1974 | Berkovitz | 187/20 |
| 3,934,482 | 1/1976 | Byers | 74/230.7 |

FOREIGN PATENTS OR APPLICATIONS

| 499,878 | 5/1930 | Germany | 74/230.5 |
| 233,199 | 4/1969 | U.S.S.R. | 254/191 |

Primary Examiner—Johnny D. Cherry
Assistant Examiner—Jeffrey V. Nase
Attorney, Agent, or Firm—D. R. Lackey

[57] ABSTRACT

An elevator system including an elevator car, a counterweight, metallic ropes or cables interconnecting the elevator car and counterweight, and a traction drive which includes a drive sheave. The drive sheave includes metallic cable groove members secured to its periphery which support and guide the cables in an axially compliant arrangement which increases the traction efficiency and reduces cable and groove wear.

6 Claims, 10 Drawing Figures

TRACTION ELEVATOR SYSTEM HAVING CABLE GROOVE IN DRIVE SHEAVE FORMED BY SPACED, ELASTICALLY DEFLECTABLE METALLIC RING MEMBERS

BACKGROUND OF THE INVENTION

1. Field of the Invention

The invention relates in general to elevator systems of the traction type, and more specifically to arrangements for increasing the traction efficency and reducing wear in such systems.

2. Description of the Prior Art

In elevator systems of the traction type, steel ropes or cables pass over a drive or traction sheave, with the ends of the cables on one side of the drive sheave being connected to the elevator car, and with the ends on the other side being connected to the counterweight. The physical size and rating of the traction machine connected to rotate the drive sheave is determined by the traction efficiency of the system, which is responsive to the ratio of the rope and/or sheave life to the required tractive effort.

Tractive effort has been increased by constructing the cable grooves of the drive sheave with relatively wide undercuts, such as about ⅜ inch (9.5 mm.) for ½ inch (12.7 mm.) rope, in order to pinch the rope and/or an additional wrap around the drive sheave is provided in combination with an additional secondary or idler sheave. A wide undercut in the cable groove severely pinches the rope, adversely affecting its useful operating life, and the double wrap idler sheave arrangement doubles the load on the shaft and bearings of the drive sheave in addition to adversely affecting useful operating life of the rope due to the additional bends therein. These structures also limit the operating pressure (radial force per inch) in the cable grooves, which usually requires that the diameter of the drive sheave be increased and/or a larger number of ropes are required, resulting in uneconomical low speed machines.

My U.S. Pat. No. 3,838, 752, which is assigned to the same assignee as the present application, discloses arrangements for increasing traction efficiency of a traction elevator system by utilizing a synthetic traction lubricant which increases the coefficient of friction between the ropes and the cable grooves of the sheave, while extending the useful operating life of the ropes due to the lubrication thereof. In addition to the advantages provided by the synthetic lubricants disclosed in my patent, it would be desirable to provide a new and improved mechanical arrangement, for further improving the tractive effort of a traction elevator system, which mechanical arrangement may be used with the synthetic lubricants, if desired.

SUMMARY OF THE INVENTION

Briefly, the present invention is a new and improved traction elevator system which includes an elevator car, a counterweight, metallic ropes or cables interconnecting the elevator car and counterweight, and a traction drive which includes a drive sheave having cable grooves over which the cables pass, and a drive motor connected to rotate the drive sheave. Each cable groove includes at least one metallic portion which compliantly increases the area of contact between the cable groove and the associated cable responsive to forces in the cable due to acceleration and deceleration of the system components, as well as the forces in the cable due to the weight of the connected components. In a preferred embodiment, each cable groove is divided into first and second spaced metallic ring portions, with the spacing being in the direction of the rotational axis of the drive sheave, and with the spaced metallic ring portions each being deflectable, pivotable, or otherwise movable about predetermined longitudinal axes in opposite rotational directions by the associated cable in response to forces in the rope. This arrangement is broadly referred to as axially compliant grooves, since the grooves are divided in the direction of the axis of the drive sheave.

BRIEF DESCRIPTION OF THE DRAWINGS

The invention may be better understood, and further advantages and used thereof more readily apparent, when considered in view of the following detailed description of exemplary embodiments, taken with the accompanying drawings, in which.

DESCRIPTION OF PREFERRED EMBODIMENTS

Figure 1:
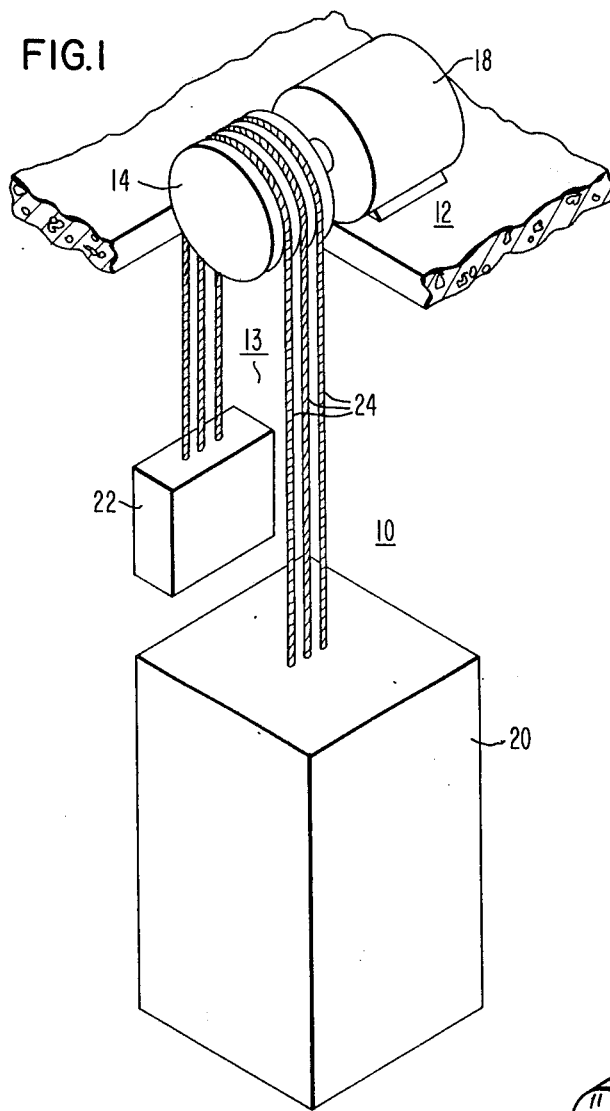
FIG. 1 is a perspective view of a traction elevator system utilizing half wrap roping, which may utilize the teachings of the invention.

Referring now to the drawings, and FIG. 1 in particular, ther is shown a perspective view of an elevator system 10 of the traction type, which may utilize the teachings of the invention. The elevator system 10 includes a traction machine 12, which may be a gearless machine, or a geared machine. For purposes of example, a gearless machine is illustrated. The traction machine 12 is generally mounted in the penthouse of a structure having a plurality of floors to be served by the elevator system, with the traction machine being mounted over a hoistway 13. Traction machine 12 includes a traction or drive sheave 14, an electric drive motor 18, and a brake assembly (not shown). The drive sheave 14 includes cable grooves for guiding, supporting and pinching the hoist roping, which grooves are conventionally formed directly in the outer surface of the sheave, but which in the present invention are separate assemblies carried by the drive sheave, as will be hereinafter explained.

An elevator car 20 is mounted for movement in the hoistway 13 to serve the floors or landings of the associated building or structure. The elevator car 20 is connected to a counterweight 22 by a plurality of wire cables or ropes 24 which pass around the traction or drive sheave 14. A deflection or secondary sheave may be used when necessary to properly space the elevator car and counterweight. The ropes 24 are thus held in frictional engagement with the cable grooves of the drive sheave 14 by the weight of the elevator car 20 and counterweight 22, with the ropes or cables making a half wrap around the sheave 14, which is also commonly called "single wrap".

Figure 2:
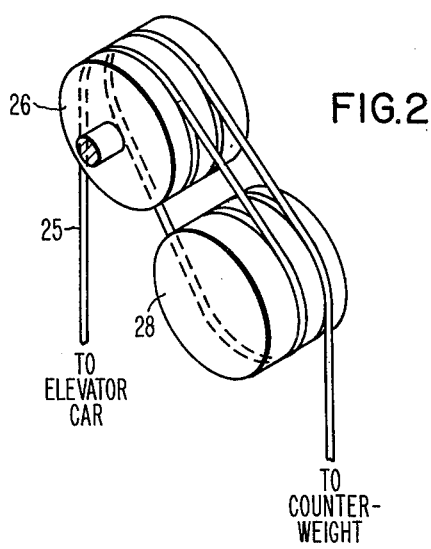
FIG. 2 is a perspective view of drive and idler sheaves which illustrate how the elevator system shown in FIG. 1 would be modified to provide a full wrap roping arrangement.

The invention also applies to the full wrap roping arrangement, also called "double wrap", which arrangement is often used in high speed gearless elevator applications in order to increase tractive effort. In certain applications the invention may make it unnecessary to resort to the full wrap. The full wrap adversely affects rope life due to the additional bends required in the rope. Further, the full wrap increases the loading on the drive machine, compared with the single wrap, and a larger sheave diameter is usually necessary in order to increase the radius of curvature in the rope as it wraps around the sheave. Increasing the drive sheave diameter reduces the amount of power available from any given armature of the drive motor. FIG. 2 is a fragmentary, perspective view which illustrates the full wrap arrangement for a single rope or cable 25. The full wrap arrangement includes a traction or drive sheave 26 and a secondary or idler sheave 28. If the diameter of the drive sheave 26 is equal to one-half the width of the hoistway 13, the secondary sheave 28 may be placed directly below the drive sheave 26. If one-half of the width of the hoistway 13 is greater than the diameter of the drive sheave, the secondary sheave 28 is spaced from the drive sheave to deflect the ropes outwardly and lead them vertically downward to the counterweight. Each rope, such as rope 25 extends upwardly from the elevator car and passes around the drive sheave 26 to the secondary sheave 28, it proceeds around the secondary sheave to the drive sheave, around the drive sheave for a second time, back to the secondary sheave, and then vertically downward to the counterweight.

Figure 3:
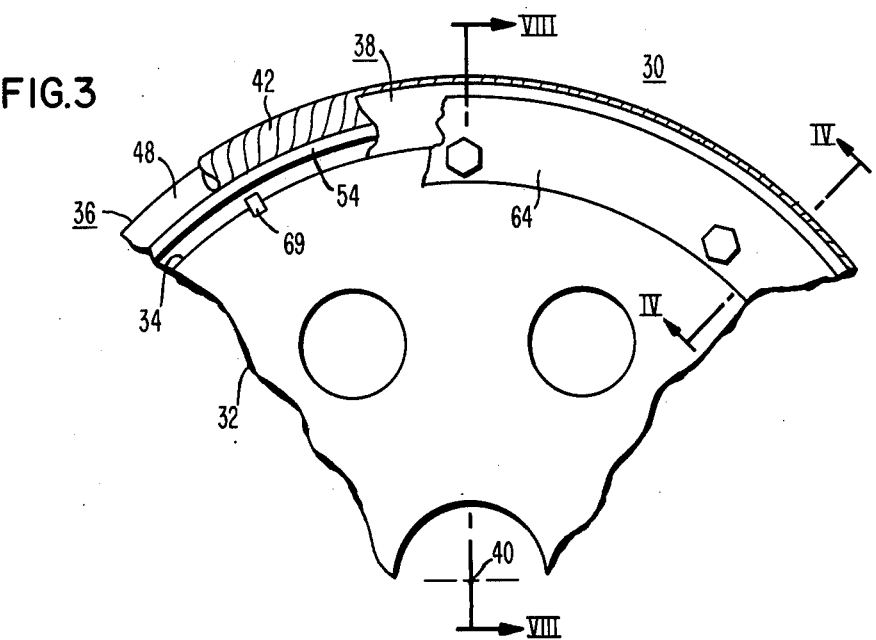
FIG. 3 is a fragmentary, elevational view of a drive sheave constructed according to the teachings of the invention wherein the cable grooves are axially compliant to their associated cables.
Figure 4:
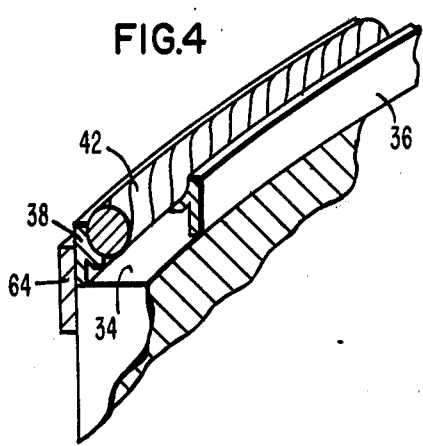
FIG. 4 is a fragmentary, cross-sectional view, in perspective, of the cable groove structure shown in FIG. 3, taken between arrows IV—IV.
Figure 8:
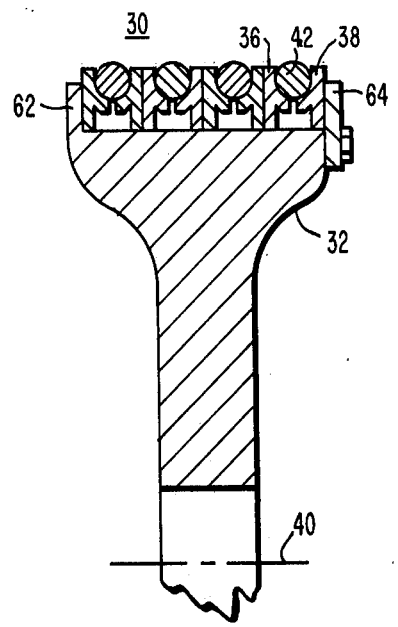
FIG. 8 is a cross-sectional view of the sheave shown in FIG. 3, taken between arrows VII—VIII.
Figure 6:
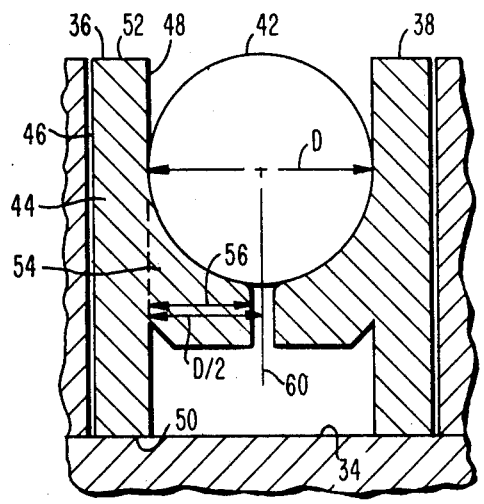
FIG. 6 is a cross-sectional view of the cable groove of the sheave shown in FIG. 3, illustrating the elements of the cable groove when the forces of the cable on the groove are minimal.
Figure 7:
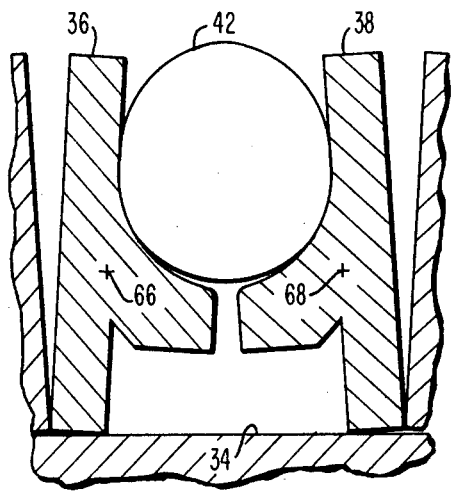
FIG. 7 is a cross-sectional view of the elements of the cable groove of a sheave shown in FIG. 3, when the rope is applying substantial forces to the elements of the cable groove, such as during acceleration.

FIG. 3 is a fragmentary elevational view of a drive sheave assembly 30 constructed according to the teachings of the invention, which may be used for the drive sheave 14 shown in FIG. 1. It may also be used for the drive sheave 26 shown in FIG. 2, but the increased traction obtainable with the sheave construction shown in FIG. 3 may make it unnecessary to resort to the full wrap. FIG. 4 is a perspective view of a portion of the sheave assembly 30, taken between arrows IV—IV, and FIG. 8 is a cross-sectional view of the sheave assembly 30 taken between arrows VIII—VIII, and these Figures will also be referred to when describing the FIG. 3 embodiment. FIGS. 6 and 7 are cross-sectional views of the rope and the elements which cooperate to provide the rope groove, and these Figures will also be referred to when describing the FIG. 3 embodiment.

More specifically, drive sheave assembly 30 includes a metallic sheave 32 which may be constructed similar to the conventional prior art drive sheave, except the outer surface or periphery 34 may be smooth, instead of having rope grooves formed therein. Each rope groove is formed by a separate rope groove assembly which is carried by the periphery 34 of the drive sheave 32, with the groove assembly being formed in a manner which provides a variable tractive effort, ie., one that increases when it is needed, such as during acceleration. As illustrated in FIG. 3, this groove assembly preferably includes first and second ring-like metallic members 36 and 38 which are spaced in the direction of the rotational axis 40 and which cooperate to provide a groove for a metallic cable or rope 42. Members 36 and 38 are formed of a metal such as steel, conventional cast iron, nodular iron, or any other suitable metallic material which may be elastically deflected by forces in the rope. Members 36 and 38 are of like construction. Their orientations are different, in order to cooperatively define a cable groove. Since they are of like construction, only ring member 36, best shown in FIG. 6, will be described in detail.

More specifically, ring member 36 includes a first portion 46 which is substantially washer shaped, having first and second flat major opposed sides or surfaces 46 and 48, which are joined by an inner edge 50, which defines the opening in the washer shaped portion 44, and an outer edge 52. The opening defined by the inner edge 50 has substantially the same dimension as the outside diameter of the sheave 32, such that the ring member 36 may be snugly placed on the sheave with a smooth sliding fit. Ring member 36 includes a second portion 54 which starts on the second major side 48 about one-third of the way in from the outer edge 52, and it then curves smoothly outward for a predetermined dimension from side 48, with this dimension being indicated at 56. Dimension 56 is slightly less than one-half the diameter D of the rope 42. Thus, when the ring members are oriented as illustrated in FIG. 6 with their second portions 54 facing one another, and the rope 42 is placed in the groove formed by portion 54, a small gap 60 is automatically formed between the extreme ends of the second portion 54. Gap 60 functions as a small undercut at the bottom of the groove, and it also permits deflection of the ring members 36 and 38 towards one another without interference.

As best illustrated in FIG. 8, a plurality of rope grooves may be formed simply by selecting the desired number of ring members and sliding them over the outside diameter of the sheave 32, alternating their orientations. One side of the sheave 32 may have an integral outward extension 62 which functions as a stop at one axial end of the sheave, and once the desired number of ring members are placed on the sheave 32, a washer shaped stop 64 may be bolted to the other axial end of the sheave 32, to prevent the ring members from moving in the direction of the drive axis 40. Each rope automatically spaces the ring members of its associated pair, with the dimension between the end stops 62 and 64 being selected to snugly stack the groove assemblies when the ropes are positioned in the grooves.

As illustrated in FIG. 3, each ring member may have a cut-out portion on its inner edge and a groove may be cut across the surface 34 of the sheave parallel to the drive axis 40. When the cut-out portions of the rings are aligned over the groove in the outer surface of the sheave, a key 69 may be inserted into the resulting opening which prevents the ring members from rotating relative to the sheave surface 34.

Figure 5:
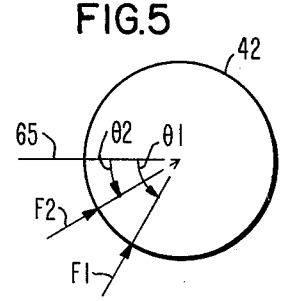
FIG. 5 is a cross-sectional view of the rope shown in FIG. 3, illustrating the forces thereon by the compliant groove.

The rope grooves of the invention comply with the associated rope. Each groove assembly allows a small amount of deflection of the groove elements in response to forces in the associated rope. The groove assemblies are constructed such that as the deflection of the elements increases, the groove elements increase the amount of their surface which is contact with the rope, which is referred to as wrap. This increase in wrapping has several important and beneficial effects. It increases the area of wear, and by spreading the area of wear, the amount of wear at any one location is reduced. It also increases tractive effort while reducing wear, increasing the traction efficiency. FIG. 5 is a diagram which illustrates the forces of the ring member 36 on the rope 42. The force vector F1 illustrates the case for very little wrap, such as would result from the unstressed configuration of the ring members 36 and 38 shown in FIG. 6. The force vector F1 forms an angle $\theta1$ with a horizontal line 65 which intersects the center of the rope 42. Forces in the rope 42 due to acceleration and deceleration of the components of the elevator system, as well as the forces due to the connected loads which have a component thereof in a direction which deflects the ring members, all cooperate to increase the wrap of the groove on the rope 42, resulting in a groove configuration such as illustrated in FIG. 7. The forces in the rope 42 deflect or pivot ring member 36 clockwise about an axis indicated generally at 66, when viewing the ring member 36 in FIG. 7, and ring member 38 is rotated counterclockwise about an axis indicated generally at 68. As the wrap increases, the force vector associated with the ring member 36 shown in FIG. 5 swings clockwise to a position indicated by F2, which reduces the angle $\theta1$ to an angle $\theta2$. Any decrease in the angle $\theta$ increases the tractive effort. It is analogous to increasing the wedging effect of the rope in the undercut of prior art grooves, without the adverse affect on rope life associated with increasing the width of the undercut in the prior art to accomplish the increase in tractive effort with prior art groove structures.

Figure 9:
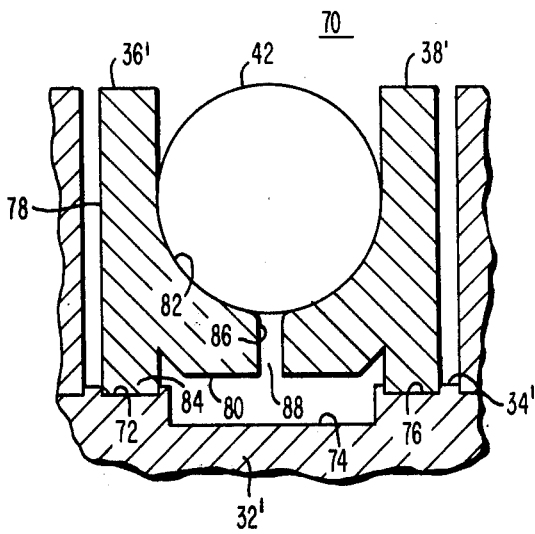
FIG. 9 is a cross-sectional view of an axially compliant groove assembly constructed according to another embodiment of the invention.

FIG. 9 is a fragmentary cross-sectional view of a groove assembly 70 constructed according to another embodiment of the invention, which may be used in the sheave assembly 30 shown in FIG. 3 in place of the illustrated groove assembly. Like components in FIGS. 3 and 9 are given like reference numerals, while similar but modified components are given the same reference numerals with a prime mark. In the embodiment of FIG. 9, the outer surface 34' of the drive sheave 32' is grooved at three spaced locations 72, 74 and 76 for each groove assembly, with these grooves extending about the circumference of the sheave 32'. First and second ring members 36' and 38' are of like construction. For example, ring member 36' has a substantially L-shaped cross-sectional configuration, having a vertically extending side portion 78, a base portion 80, and a curved portion 82 which extends between the vertical side 78 and the base 80 to define a portion of the groove for receiving the rope 42. A downwardly extending projection 84 is provided on the base 80 near the side portion 78, which is sized to enter the groove 72 when the ring member 36' is heated, placed in position over the sheave and cooled to shrink the ring member 36' firmly into position on the sheave 32'. The outwardly extending end 86 of the base portion extends over the groove or undercut 76 in the sheave 32', allowing the ring member 36' to deflect in a clockwise direction without interference with the sheave surface 34'. The groove assembly 70 functions in a manner similar to that described relative to the FIG. 3 embodiment. While ring members 36' and 38' are illustrated as discrete separate members having a gap 88 between them which functions as an undercut, a compliant groove which increases its wrap responsive to forces in the associated rope may also be formed by constructing the ring members 36' and 38' as one integral member, joined across gap 88. This structure would be sized to elastically deflect and increase the wrap of the groove on the rope.

Figure 10:
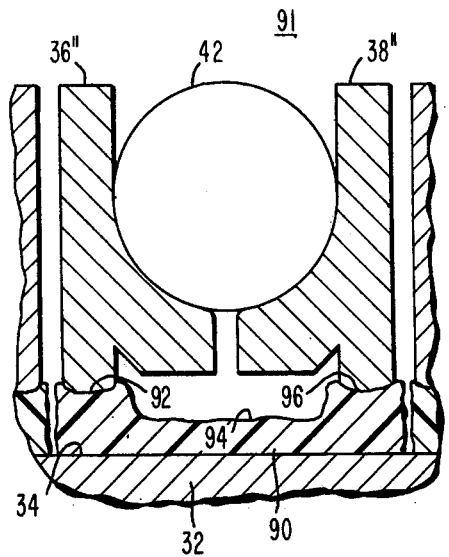
FIG. 10 is a cross-sectional view of an axially compliant groove assembly constructed according to still another embodiment of the invention.

FIG. 10 is a fragmentary, cross-sectional view of a groove assembly 91 constructed according to another embodiment of the invention, which may be used in the sheave assembly 30 shown in FIG. 3 in place of the illustrated groove assembly. In this embodiment, the surface 34 of the sheave 32 is not grooved, as in the FIG. 9 embodiment. Instead, a circumferential band 90 of elastomeric material, such as neoprene or polyurethane, is bonded or otherwise attached to the surface 34 of the sheave 32. The outer surface of the elastomeric band is undercut at 94 and the ring members 36'' and 38'' are placed adjacent the undercut, on opposite sides thereof. The ring members 36'' and 38'' are similar to those shown in FIG. 9, except they have rounded projections 92 and 94, respectively, which either deflect the elastomeric band, or which extend into grooves formed in the outer surface of the band, in order to axially position the ring members. The resilience of the elastomeric band 90 is selected to provide the proper amount of wrap by the ring members on the rope as the rope forces on the ring members increases.

In summary, there has been disclosed a new and improved elevator system in which the traction efficiency may be improved by one or more axially compliant rope groove assemblies. The axial compliance of the rope grooves to the hoist ropes improves tractive effort and reduces wear between the ropes and grooves, allowing higher groove pressures, smaller sheaves, and more power output from a given armature of the drive motor.

The rings or elements which cooperate to form the rope grooves may be made of a special metallic material adapted specifically for its intended purpose, and the drive sheave may be formed of a different more economical material, also selected for its specific purpose. In the prior art, the drive sheave and grooves are integral, and thus the complete sheave must be formed of a material suitable for the rope grooves.

In the prior art, when the groove wear becomes excessive, the sheaves must be regrooved, which is a costly process. In the present invention, regrooving of a drive sheave is merely a matter of removing the separate elements which cooperate to form a groove, and replacing them with new elements.

The separate discrete rings which provide the cable grooves may be readily hardened, which permits higher tensile ropes to be used without offsetting wear.

I claim as my invention:
1. An elevator system, comprising:
   an elevator car,
   a counterweight,
   drive means including a drive motor connected to a drive sheave, said drive sheave having a periphery rotatable about a drive axis, cable groove means on the periphery of said sheave which defines at least one cable groove, and a cable interconnecting said elevator car and said counterweight while disposed about said drive sheave in said at least one cable groove, said cable groove means including first and second independent, metallic ring portions spaced apart along the drive axis of said drive sheave, each of said first and second metallic ring portions including a washer shaped portion having inner and outer edges and first and second opposed parallel surfaces, and a projecting portion which extends outwardly from one of said parallel surfaces, said first and second metallic ring portions being disposed with the projection portions adjacent one another to cooperatively define the cable groove, said inner edges of the washer shaped portions being in contact with predetermined surfaces of said drive sheave, said washer shaped portions of the first and second metallic ring portions being elastically and rotatably deflectable towards one another about predetermined circumferential longitudinal axes, from unstressed positions by said cable acting on said outwardly extending projecting portions, with the magnitude of the rotational deflections being proportional to forces in the cable, said first and second metallic ring portions increasing their surface area in contact with the cable as the washer shaped portions rotatably deflect, to increase the tractive effort between the drive sheave and cable when said drive motor rotates said sheave.

2. The elevator system of claim 1 wherein the drive sheave defines a circumferential groove and the cable groove means is disposed relative to said circumferential groove such that the circumferential groove accommodates the rotational deflections of the first and second metallic ring portions.

3. An elevator system, comprising:
an elevator car,
a counterweight,
drive means including a drive sheave having a periphery rotatable about a drive axis,
a plurality of cable grooves on the periphery of said sheave,
and a plurality of cables interconnecting said elevator car and said counterweight while disposed about said drive sheave in said plurality of cable grooves,
each of said cable grooves including first and second independent metallic ring members spaced apart along the drive axis of said drive sheave, each of said first and second metallic ring portions including a washer shaped portion having inner and outer edges and first and second opposed parallel surfaces, and a projecting portion which extends outwardly from one of said parallel surfaces, said first and second metallic ring portions being disposed with the projecting portions adjacent one another to cooperatively define the cable grooves, said inner edges of the washer shaped portions being in contact with predetermined surfaces of said drive sheave, said washer shaped portions of the first and second ring members being elastically and rotatably deflectable towards one another, about predetermined circumferential axes, wherein the area of contact between each cable groove and the associated cable is responsive to the forces in the cable.

4. An elevator system, comprising:
an elevator car,
a counterweight,
drive means including a drive motor connected to a drive sheave, said drive sheave having a periphery rotatable about a drive axis,
cable groove means on the periphery of said sheave which defines at least one cable groove,
and a cable interconnecting said elevator car and said counterweight while disposed about said drive sheave in said at least one cable groove,
said cable groove means including first and second independent, metallic ring portions spaced apart along the drive axis of said drive sheave, to cooperatively define the cable groove, said first and second metallic ring portions being elastically and rotatably deflectable towards one another about predetermined circumferential longitudinal axes, from unstressed positions by said cable, with the magnitude of the rotational deflections being proportional to forces in the cable, said first and second metallic ring portions increasing their surface area in contact with the cable as they rotatably deflect to increase the tractive effort between the drive sheave and cable when said drive motor rotates said sheave, said drive sheave including first and second circumferential grooves for axially locating the first and second metallic ring portions, and a third circumferential groove intermediate the first and second circumferential grooves, said third circumferential groove accommodating the rotational deflections of the first and second metallic ring portions.

5. An elevator system, comprising:
an elevator car,
a counterweight,
drive means including a drive motor connected to a drive sheave, said drive sheave having a periphery rotatable about a drive axis,
cable groove means on the periphery of said sheave which defines at least one cable groove,
a cable interconnecting said elevator car and said counterweight while disposed about said drive sheave in said at least one cable groove means,
said cable groove means including a first metallic portion which is deflectable from an unstressed position by said cable, with the deflection being proportional to forces in the cable, said cable groove means being configured to increase the surface area thereof which contacts the cable as the first metallic portion is deflected, to increase the tractive effort between the drive sheave and cable when said drive motor rotates said drive sheave, and elastomeric means disposed about the periphery of said drive sheave, said cable groove means being disposed about and in contact with said elastomeric means, said elastomeric means accommodating the deflection of said first metallic portion.

6. The elevator system of claim 5 wherein the cable groove means includes a second metallic portion spaced along the drive axis from the first metallic portion, said first and second metallic portions cooperatively defining the cable groove, said second metallic portion deflecting in a manner similar to that of the first metallic portion to aid the tractive effort.

* * * * *